(12) United States Patent
Ueberschlag

(10) Patent No.: US 8,468,897 B2
(45) Date of Patent: Jun. 25, 2013

(54) MEASURING SYSTEM FOR DETERMINING AND/OR MONITORING FLOW OF A MEASURED MEDIUM THROUGH A MEASURING TUBE

(75) Inventor: Pierre Ueberschlag, Saint-Louis (FR)

(73) Assignee: Endress + Hauser Flowtec AG, Reinach (CH)

( * ) Notice: Subject to any disclaimer, the term of this patent is extended or adjusted under 35 U.S.C. 154(b) by 136 days.

(21) Appl. No.: 12/996,065

(22) PCT Filed: Jun. 2, 2009

(86) PCT No.: PCT/EP2009/056726
§ 371 (c)(1),
(2), (4) Date: Dec. 3, 2010

(87) PCT Pub. No.: WO2009/147128
PCT Pub. Date: Dec. 10, 2009

(65) Prior Publication Data
US 2011/0132102 A1     Jun. 9, 2011

(30) Foreign Application Priority Data
Jun. 3, 2008  (DE) .......................... 10 2008 002 166

(51) Int. Cl.
*G01F 1/66*     (2006.01)
(52) U.S. Cl.
USPC ...................................... 73/861.27
(58) Field of Classification Search
USPC ............. 73/861.355, 861.18, 861.29, 861.12, 73/861.31, 861.327
See application file for complete search history.

(56) References Cited

U.S. PATENT DOCUMENTS

| | | | |
|---|---|---|---|
| 6,508,133 B1 * | 1/2003 | Adachi et al. | 73/861.18 |
| 2011/0094309 A1 * | 4/2011 | Berger et al. | 73/861.28 |
| 2011/0094312 A1 * | 4/2011 | Bitto et al. | 73/861.355 |

FOREIGN PATENT DOCUMENTS

| | | |
|---|---|---|
| DE | 198 61 075 C2 | 12/1999 |
| DE | 100 36 696 A1 | 2/2001 |
| DE | 102 04 714 A1 | 2/2003 |
| DE | 102 04 715 A1 | 2/2003 |
| DE | 10 2006 012 114 A1 | 9/2007 |
| EP | 1 235 056 A2 | 8/2002 |
| EP | 1 413 858 A1 | 4/2004 |
| JP | 58-106721 | 7/1983 |
| JP | 2003 262545 A | 9/2003 |
| JP | 2005 037219 A | 2/2005 |
| WO | WO 02/45074 A1 | 6/2002 |
| WO | WO 02/055966 A2 | 7/2002 |

* cited by examiner

*Primary Examiner* — Jewel V Thompson
(74) *Attorney, Agent, or Firm* — Bacon & Thomas, PLLC

(57) ABSTRACT

A measuring system for determining and/or monitoring flow of a measured medium through a measuring tube, including: at least one ultrasonic transducer; and at least one control/evaluation unit, which, on the basis of measurement signals or on the basis of measurement data derived from the measurement signals, ascertains volume- and/or mass-flow of the medium flowing in the measuring tube; wherein the ultrasonic transducer has at least one electromechanical transducer element, which sends and/or receives ultrasonic signals; and at least one coupling layer in the region between electromechanical transducer element and measured medium, which coupling layer conducts the ultrasonic signals, and which ultrasonic transducer is acoustically coupleable with the measuring tube and at least partially fittable on the outer shape of the measuring tube and which electromechanical transducer element is flexible.

15 Claims, 17 Drawing Sheets

MEASURING SYSTEM FOR DETERMINING AND/OR MONITORING FLOW OF A MEASURED MEDIUM THROUGH A MEASURING TUBE

TECHNICAL FIELD

The present invention relates to a measuring system for determining and/or monitoring flow of a measured medium through a measuring tube. The measuring system includes: at least one ultrasonic transducer; and at least one control/evaluation unit, which, on the basis of measurement signals or on the basis of measurement data derived from the measurement signals, ascertains volume- and/or mass-flow of the medium flowing in the measuring tube; wherein the ultrasonic transducer has at least one electromechanical transducer element, which sends and/or receives ultrasonic signals. The measuring system further includes at least one coupling layer in the region between the electromechanical transducer element and the measured medium. The coupling layer conducts ultrasonic signals.

BACKGROUND DISCUSSION

Ultrasonic flow measuring devices are often utilized in the field of process- and automation technology. They permit simple determination of volume- and/or mass-flow in a pipeline.

Known ultrasonic flow measuring devices work, frequently, on the basis of the Doppler principle or on the basis of the travel-time difference principle.

In the case of the travel-time difference principle, the different travel times of ultrasonic pulses in and against the flow direction of the liquid are evaluated.

For this, ultrasonic pulses are transmitted at a certain angle to the tube axis both with and opposite to the flow. From the travel-time difference, the flow velocity, and, therewith, with knowledge of the diameter of the section of pipeline, the volume flow can be determined.

In the case of the Doppler-principle, ultrasonic waves with a certain frequency are coupled into the liquid and the ultrasonic waves reflected by the liquid are evaluated. From the frequency shift between the in-coupled and reflected waves, likewise, the flow velocity of the liquid can be determined.

Reflections occur in the liquid, however, only when small air bubbles or impurities are present, so that this principle mainly finds application in the case of contaminated liquids.

Ultrasonic waves are produced or received with the help of so-called ultrasonic transducers. For this, ultrasonic transducers are fixedly applied on the tube wall of the pipeline section of concern. More recently, also clamp-on ultrasonic flow measuring systems are obtainable. In the case of these systems, the ultrasonic transducers are, essentially, just pressed on the tube wall with a clamp. Such systems are known e.g. from EP 686 255 B1, U.S. Pat. No. 4,484,478 or U.S. Pat. No. 4,598,593.

A further ultrasonic flow measuring device, which works according to the travel-time difference principle, is known from U.S. Pat. No. 5,052,230. The travel time is ascertained, in this case, by means of short, ultrasonic pulses.

A large advantage of clamp-on ultrasonic flow measuring systems is, that they do not contact the measured medium and are placed on an already existing pipeline. Disadvantageous is a higher effort in the mounting of the clamp-on systems, in order to orient the individual ultrasonic transducers oppositely, this depending on many parameters, such as e.g. tube wall-thickness, tube diameter, velocity of sound in the measured medium. Both ultrasonic transducers of medium-contacting, inline-systems, as well as also ultrasonic transducers of clamp-on systems, require, conventionally, a relatively ample installation space outside of the measuring tube. They are, thus, exposed to mechanical influences. The ultrasonic signals between the ultrasonic transducers propagate usually on one signal path. The signal path extends, in each case, only through a fraction of the flow of the measured medium in the measuring tube, and this fact strongly influences estimation of the total flow through the measuring tube.

Ultrasonic transducers are composed, normally, of a piezoelectric element, also referred to, in short, as "piezo", and a coupling layer, also referred to as "coupling wedge" or, not so frequently, "lead-in element". The coupling layer is, in such case, most often, made of synthetic material, or plastic, while the piezoelectric element of industrial process measurements technology is usually of a piezoceramic. The ultrasonic waves are produced in the piezoelectric element, guided via the coupling layer to the tube wall, and, from there, conducted into the liquid. Since the sound velocities in liquids and synthetic materials differ, the ultrasonic waves are refracted at the transitions from one medium to another. The angle of refraction is determined, to a first approximation, by Snell's law. In accordance therewith, the angle of refraction depends on the ratio of the propagation velocities in the media.

Between the piezoelectric element and the coupling layer, an additional coupling layer can be arranged, a so-called adapting, or matching, layer. The adapting layer assumes the function, in such case, of transmitting the ultrasonic signal and, simultaneously, reducing reflection caused at the interfaces by different acoustic impedances of the adjoining materials.

In DE-patent 100 12 926, a sensor system for flow measurement is disclosed, which is applied fixedly on a measuring tube. This sensor system is a piezofilm sensor, which registers vibration- and/or oscillation-variables of the measuring tube, or the wall of the measuring tube, on which the piezofilm sensor is applied, and converts these vibration- and/or oscillation-variables of the measuring tube, which are produced by interactions of a medium flowing in the measuring tube with the wall of the measuring tube, into voltage signals. By means of these voltage signals, then, the flow of the measured medium through the measuring tube is ascertained.

The piezo sensor film is placed on the outside of the wall of the measuring tube, with the measured medium flowing past the inside of the wall. For protection of the piezo sensor film, also a shielding can be applied. The piezo sensor film is, preferably, polyvinylidene fluoride (PVDF). No oscillation- or vibration-signal is radiated the piezo sensor film. The piezo sensor film only receives oscillations or vibrations caused by the flow in the interior of the measuring tube. Since, now, the interactions between inside of the wall of the measuring tube and measured medium depend on many different parameters, such as e.g. composition of the measured medium and the associated Reynolds number of the measured medium, and some of these parameters change with time, e.g. due to change of the surface of the measuring tube, e.g. from abrasive wear, the accuracy of measurement of this sensor system is very limited.

U.S. Pat. No. 3,906,791 discloses an ultrasonic flow-measuring device having a measuring tube of rectangular or square cross section. In a form of embodiment, ultrasonic transducers are applied on the flat exterior of the measuring tube wall. These transmit an ultrasonic signal essentially perpendicularly to the main flow direction of the medium in the measuring tube. The ultrasonic signal is turned in the direction of the flow of the measured medium, or oppositely thereto, by recesses of triangular cross-sectional shape on the inside of the measuring tube wall.

Described in DE-application 102 04 714 is an ultrasonic transducer, which is embodied in the shape of a circular arc or a ring, and, therewith, is capable of being coupled on circularly-shaped tubes of a certain size.

SUMMARY OF THE INVENTION

An object of the invention is to provide a flow-measuring system, whose sensors can be placed on a pipeline and require no complicated, opposing orientation.

The object is achieved by a measuring system for determining and/or monitoring flow of a medium through a measuring tube, wherein the measuring system includes: At least one ultrasonic transducer; at least one control/evaluation unit, which ascertains volume- and/or mass-flow of the medium flowing in the measuring tube on the basis of measurement signals, or on the basis of measurement data derived from the measurement signals; wherein the ultrasonic transducer includes at least one electromechanical transducer element, which sends and/or receives ultrasonic signals; and at least one coupling layer in the region between the electromechanical transducer element and the medium, which coupling layer conducts the ultrasonic signals; wherein the ultrasonic transducer is acoustically coupleable with the measuring tube and the ultrasonic transducer is embodied in such a manner that the ultrasonic transducer is at least partially fittable to the shape of the inner, and/or outer, wall of the measuring tube. Besides eliminating the opposing orientation of the clamp-on sensors, a further advantage is the very flat construction of the ultrasonic transducer.

The electromechanical transducer element converts the ultrasonic signals according to the principle of electrostriction or magnetostriction. Under magnetostriction is understood the length change of a ferromagnetic material as a result of an applied magnetic field. Electrostriction, in contrast, refers to the deformation of a dielectric material as a result of an applied electrical field. The deformation is, in such case, in general, not dependent on the direction of the field. The piezoeffect is, thus, in particular, part of the electrostriction. In an especially preferred embodiment, the electromechanical transducer element is a piezoelectric element.

The electromechanical transducer element produces ultrasonic signals and/or converts received ultrasonic signals, in turn, into electrical signals. The coupling layer conducts the ultrasonic signals. The coupling layer is, in such case, preferably of a material, which has certain acoustic properties, such as e.g. a predeterminable acoustic impedance and/or a predeterminable velocity of sound. In a special form of embodiment, the tube, itself, serves as coupling layer. If e.g. a steel tube is applied as measuring tube and the electromechanical transducer element is a piezoelectric element, then a coupling layer is providable as adapting layer between transducer element and measuring tube. If, however, the measuring tube is a synthetic material, or plastic, and/or the transducer element is an electrostrictive element, then the electromechanical transducer element is directly placeable on the measuring tube. The measuring tube assumes, in this case, the job of the coupling layer, the acoustic coupling between transducer element and measured medium.

Ultrasonic transducers produce ultrasonic signals in the form of ultrasonic waves. In liquids, ultrasonic waves propagate only as longitudinal waves. The excited particles oscillate, in such case, in the propagation direction at the magnitude of the amplitude. An ultrasonic signal is, thus, composed of at least one ultrasonic wave with a wavefront. The wavefront is in such case, perpendicular to the propagation direction of the ultrasonic waves.

An ultrasonic signal is limited in its width. I.e., the wavefront has a finite extent. The essential factor limiting the width of an ultrasonic signal is the area of the ultrasonic transducer, from which the ultrasonic wave radiated is. For purposes of simplification, it is assumed, that an ultrasonic signal of a limited width propagates on a sharp sound- or signal-path. The width of the signal path is, in such case, to be considered as point-shaped. As modeled, an ultrasonic signal propagates, thus, on a straight-line signal path. The propagation direction of the ultrasonic waves corresponds, thus, to the direction of the ultrasonic signal on the signal path.

An ultrasonic transducer has, according to the invention, at least one electromechanical transducer element, e.g. a piezoelectric element, which transmits and/or receives ultrasonic signals on at least a first signal path, and a coupling layer in the region between electromechanical transducer element and measured medium conducts the ultrasonic signals on the first signal path. Instead of one electromechanical element, also a number of elements can be applied. These are arranged e.g. next to one another and/or on top of one another, in so-called stacks. In the case of stacks, the individual elements are contacted and connected in series, or in sandwich construction.

In a first embodiment of the invention, the electromechanical transducer element is flexible. The electromechanical transducer element has, at least during the mounting of the ultrasonic transducer, a certain flexibility. E.g., due to curing of an adhesive or through cooling of the electromechanical transducer element, which is flexible at a mounting temperature, a flexibility does not necessarily have to remain when the ultrasonic transducer is being used.

In an advantageous further development of the apparatus of the invention, the electromechanical transducer element is a film.

A film is a thin sheet, which is manufacturable in a continuous web that can be rolled up. The thickness of a film depends on various material parameters.

Especially advantageous are films of piezoelectric polyvinylidene fluoride, or PVDF for short. PVDF-films are, most often, less than 1 mm thick.

If the pipeline, on which the ultrasonic transducer is coupleable and whose shape the ultrasonic transducer can fit, has an approximately circularly round, or oval, cross section, then the electromechanical transducer element assumes the shape of a singly or doubly curved shell. Ultrasonic signals are radiatable and/or receivable over, approximately, the entire area of the electromechanical transducer element. Two shells are parallel, when their tangents and their generatrices are parallel relative to one another.

A very advantageous further development of the apparatus of the invention is to be seen in features, that the electromechanical transducer element is applicable on a first surface of the coupling layer and the ultrasonic signal enters into the first surface of the coupling layer and/or exits out of the first surface of the coupling layer, in both cases, essentially perpendicularly to the first surface of the coupling layer, and the coupling layer at least partially so refracts the ultrasonic signal, that a first directional component of the ultrasonic signal points in, or opposite to, the flow direction of the measured medium in the measuring tube and/or that a second directional component of the ultrasonic signal extends perpendicularly to the flow direction of the measured medium in the measuring tube.

The propagation direction of the ultrasonic signal on the first signal path is essentially perpendicular to the first surface of the first coupling layer in the case of the signal entering and/or in the case of signal exiting out of the first surface of the first coupling layer. At an interface between first coupling layer and measured medium or between first coupling layer and a second coupling layer, the ultrasonic signal is refracted.

If the ultrasonic signal is refracted, or deflected, perpendicularly to the flow direction of the measured medium in the measuring tube, thus provided with a directional component in the radial direction, then a flow measurement is possible with the travel-time difference method, e.g. with preceding flow conditioning.

With an ultrasonic transducer without a coupling layer, at whose interface the ultrasonic signal is deflected in a certain direction, parameters of the measured medium, such as e.g. the velocity of sound in the measured medium, can be determined. The ultrasonic signal travels thus on a straight path perpendicular to the electromechanical transducer, through the measuring tube.

An advantageous further development of the apparatus of the invention provides, that the electromechanical transducer element is applicable on a first surface of the coupling layer and the ultrasonic signal enters into the first surface of the coupling layer and/or exits out of the first surface of the coupling layer, in both cases essentially perpendicularly to the first surface of the coupling layer, and the coupling layer so refracts the ultrasonic signal on two signal paths, that a first directional component of the ultrasonic signal points on a first signal path in, and a third directional component of the ultrasonic signal on a second signal path opposite to, the flow direction of the measured medium in the measuring tube. The ultrasonic signal is thus deflected in two directions and propagates, thus, then on two separate signal paths. This is realizable with a single electromechanical transducer element.

Another advantageous further development of the apparatus of the invention provides, that the coupling layer has at least one recess, which has an approximately trapezoidal cross section.

Preferably, the recess forms a groove. The groove with the approximately trapezoidal cross section extends perpendicular to the approximately trapezoidal cross section. The cross section is continued in the longitudinal direction.

Especially advantageously, the groove extends at an angle of 0° to 90° to the tube axis, i.e. the longitudinal direction of the groove extends at an angle of 0° to 90° to the tube axis. In the case of an approximately circularly round, or oval, cross section of the measuring tube and corresponding form and shape of the ultrasonic transducer, the groove assumes a circularly round or oval, longitudinal sectional shape. The angle is relative to the tangents to the ultrasonic transducer.

In the case of a very advantageous, further development of the invention, the recesses are arranged approximately uniformly over the area of the coupling layer. The separation of the recesses from one another remains essentially equal. In a further development, the recesses have approximately equal cross sections.

In an advantageous further development of the apparatus of the invention, it is provided, that the recesses are introduced into two oppositely lying sides of the coupling layer.

A supplementing, further development of the apparatus of the invention provides, that the recesses are an integral feature of the measuring tube. A variant of the apparatus of the invention provides, that the measuring tube has a screw thread in its inner wall and/or outer wall.

An advantageous further development of the apparatus of the invention provides, that the recesses are triangularly shaped, wherein a side of the triangularly shaped recess is essentially parallel to at least one propagation direction of the ultrasonic signal. In a form of embodiment, a side of the triangularly shaped recess is essentially perpendicular to at least one propagation direction of the ultrasonic signal. The ultrasonic signal propagates, in such case, as modeled, along an approximately sharp, signal path.

In an additional, advantageous, further development of the solution of the invention, the measuring system determines and/or monitors the flow of the measured medium through the measuring tube with the travel-time difference method or the Doppler method.

In an especially advantageous form of the invention, the measuring system includes at least two ultrasonic transducers, which are so arranged on the measuring tube, that the ultrasonic signal travels on the first signal path between both ultrasonic transducers.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
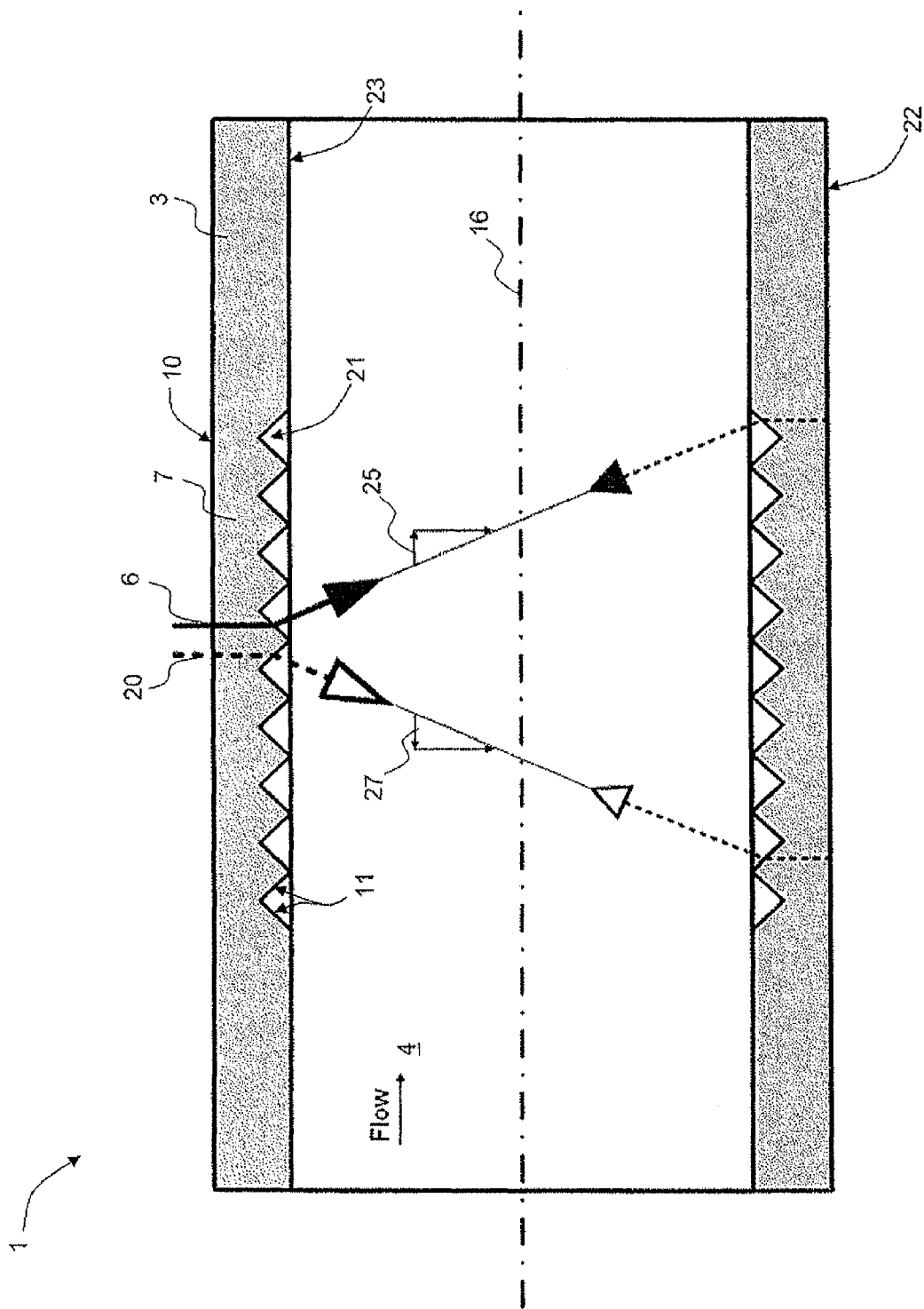
FIG. 1 shows in longitudinal section, a measuring tube with trapezoidal recesses of the invention on its inside.

FIG. 1 shows a measuring system of the invention in longitudinal section. The measuring tube 3 has essentially cross-sectionally triangle-shaped recesses 21 in the measuring tube inner wall 23, which recesses 21 form a groove in the measuring tube inner wall 23. The triangular shape of the cross sections of the recesses 21 is an extreme form of a trapezoid. A trapezoid is determined by four sides, which enclose four angles. If one of these angles is zero, so that one side-length is zero, a triangle results. Other extreme forms are e.g. a rectangle or a line. If, instead of the triangular shape, a trapezoid of two oppositely lying, parallel surfaces is used, which are approximately parallel to a tangential plane on the measuring tube wall, then parameters of the medium, such as e.g. the velocity of sound, can be determined simultaneously with the flow. Through the tube curvature, the trapezoid can have slightly curved sides, wherein, however, the cross section of the recesses 21 is still, approximately, to be recognized as trapezoidal.

The recesses 21 can be filled with a material or, such as here, filled by the measured medium 4. The electromechanical transducer, preferably a piezoelectric film 5 (here, for purposes of simplification, not shown), is placed on the part of the measuring tube outer wall 22 lying opposite to the recesses 21, i.e. the region of the measuring tube 3 having the recesses 21 has, likewise, the piezoelectric film 5, only on the other side of the measuring tube wall. Ultrasonic signals, which are radiated from the piezoelectric film 5 approximately perpendicularly to the outer wall 22 of the measuring tube 3, thus perpendicular to an imaginary tangential plane, meet the recesses 21 and are deflected in accordance with the angle, with which they meet the interface between measuring tube 3 and measured medium 4, and in accordance with the different sound velocities of the two mutually bordering materials, thus here the sound velocities in the measuring tube 3 and in the measured medium 4. This is true, naturally likewise for ultrasonic signals, which meet the piezoelectric film 5 from the direction of the measured medium 4. The measuring tube 3 assumes here, simultaneously, the function of a first and, in this case, single coupling layer 7. Thus, the measuring tube outer wall forms the first surface 10 of the first coupling layer 7 and the interface between measuring tube 3 and measured medium 4 is the second surface 11 of the first coupling layer 7.

The inscribed ultrasonic signal path 6 shows the ultrasonic signal route. It is perpendicular to the wave-front of an ultrasonic signal. An ultrasonic signal moves on the signal path 6 in both directions, when the refractions at the side of the peripherally arranged ultrasonic transducer 4 lying opposite to the entrance point of the signal have the same angles. This is achieved e.g. by the features that the peripheral recesses 21 have approximately constant form and shape and that they are correspondingly embodied relative to one another. The forward- and return-path of the ultrasonic signal is marked on the first signal path 6 by the two arrows.

The first directional component 25 of the ultrasonic signal on the first signal path 6 points in the main flow direction of the measured medium 4 in the measuring tube 3. The third directional component 27 of the ultrasonic signal on the second signal path 20, in contrast, points oppositely. A second directional component 26 of the ultrasonic signal on the first signal path 6 transverse to the main flow direction of the measured medium 4 in the measuring tube 3 would point into the plane of the drawing or out of the plane of the drawing.

For reasons of clarity of the following drawings, a separate statement of directional components is omitted. These are clearly evident, in each case, from the drawings. If only one direction is visible, the other directions of an ultrasonic signal of the invention are not, therefore, excluded.

Figure 2:
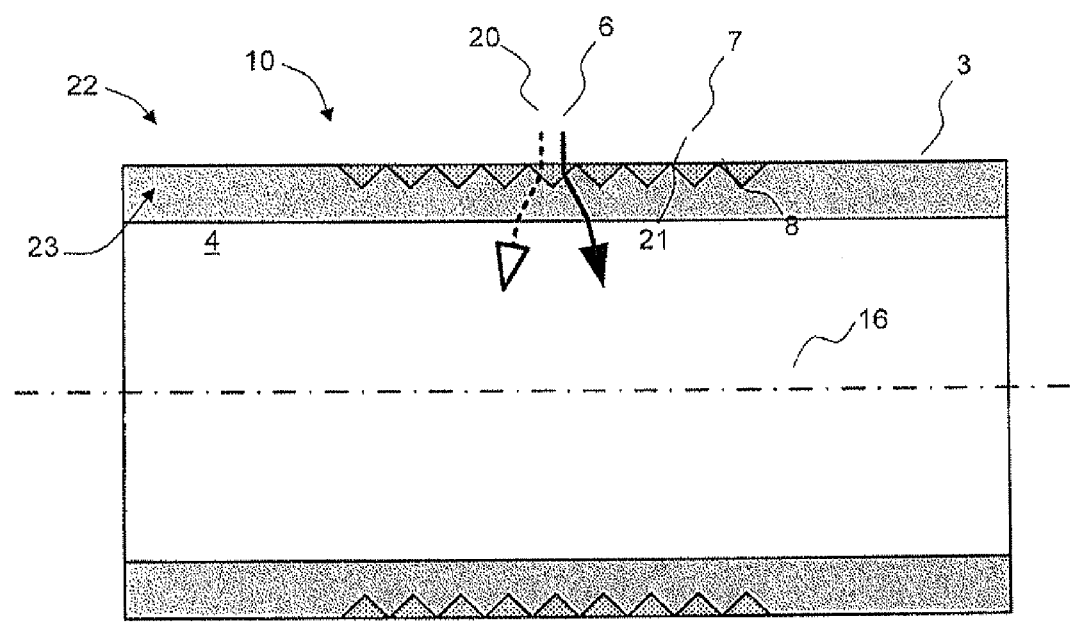
FIG. 2 shows in longitudinal section, a measuring tube with trapezoidal recesses of the invention on its outside.

In FIG. 2, the measuring tube 3 functions as a second coupling layer 8. The measuring tube 3 has trapezoidally shaped recesses in its outer wall 22, and the recesses 21 are filled e.g. with a plastic compound. The filled recesses 21 form the first coupling layer 7. On the first surface 10 of the first coupling layer 7 is applied the piezoelectric film 5, which, also here, is again not shown. At the interface between the first coupling layer 7 and the second coupling layer 8, thus at the contact surface between the second surface 11 of the first coupling layer 7 and the first surface 12 of the second coupling layer 8, an ultrasonic signal is deflected, or refracted, in accordance with the known factors. A second refraction takes place at the second surface 13 of the second coupling layer 8, the tube inner wall 23.

As in FIG. 2, so also for reasons of clarity, also in the following FIGS. 3 to 6, only the ultrasonic signals radiated away from the piezoelectric element, thus the ultrasonic signals radiated into the first coupling layer 7, are shown. The ultrasonic signals can, in such case, be either, approximately, totally reflected and turned back to the ultrasonic transducer 2 at the inner wall 23 of the measuring tube 3, when met by the ultrasonic signal, or they are, as indicated in FIG. 2, analogously to the situation at signal entrance, refracted, in case an ultrasonic transducer 2 is placed at the side of the measuring tube 3 lying opposite to the entry surface.

The angles of inclination of the surfaces of the coupling layers relative to the meeting ultrasonic signal do not have to be equal to the angle of refraction of the ultrasonic signal. This depends on the velocities of sound, among others, of the measured medium. This is a great advantage of the invention: Usual clamp-on systems must be oriented relative to one another, e.g. in the case of a changing of the measured medium. The system of the invention does not need to be newly oriented.

Figure 3:
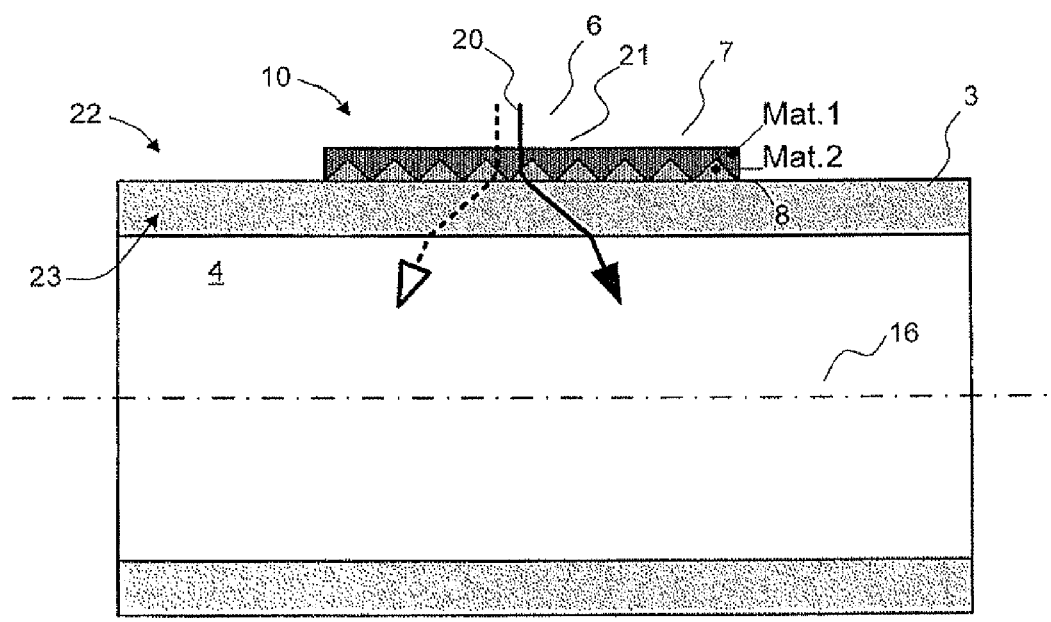
FIG. 3 shows in longitudinal section, an ultrasonic transducer of the invention, with two coupling layers on a measuring tube.

FIG. 3 shows a measuring tube 3 with an ultrasonic transducer 2 placed on its outside 22. The ultrasonic transducer 2, in such case, is composed of a piezoelectric film 5 and two coupling layers 7, 8, wherein the piezoelectric film 5 is applied on the first coupling layer 7 and the second coupling layer 8 is applied on the measuring tube 3. The piezoelectric film 5 is, for purposes of simplification, not shown. The ultrasonic signals enter, essentially perpendicular to the first surface 10 of the first coupling layer 7, into the first coupling layer 7 and out of the first coupling layer 7. Here, again, only the entry, thus the signal route away from the piezoelectric film 5, is shown. The refraction at the interface between first coupling layer 7 and second coupling layer 8 is influenced by the fact that the velocity of sound in the first coupling layer 7 is higher than in the second coupling layer 8.

In this example, the second surface 11 of the first coupling layer 7 assumes, essentially, the shape of a bellows. Since the second surface 11 of the first coupling layer 7 has trapezoidally shaped recesses 21, the first surface 12 of the second coupling layer 8 has congruent projections. Considered alone, however, the first surface 12 of the second coupling layer 8 is, likewise, provided with trapezoidal recesses 21. The two surfaces 10, 11 are to be considered as positive and negative relative to one another.

Figure 4:
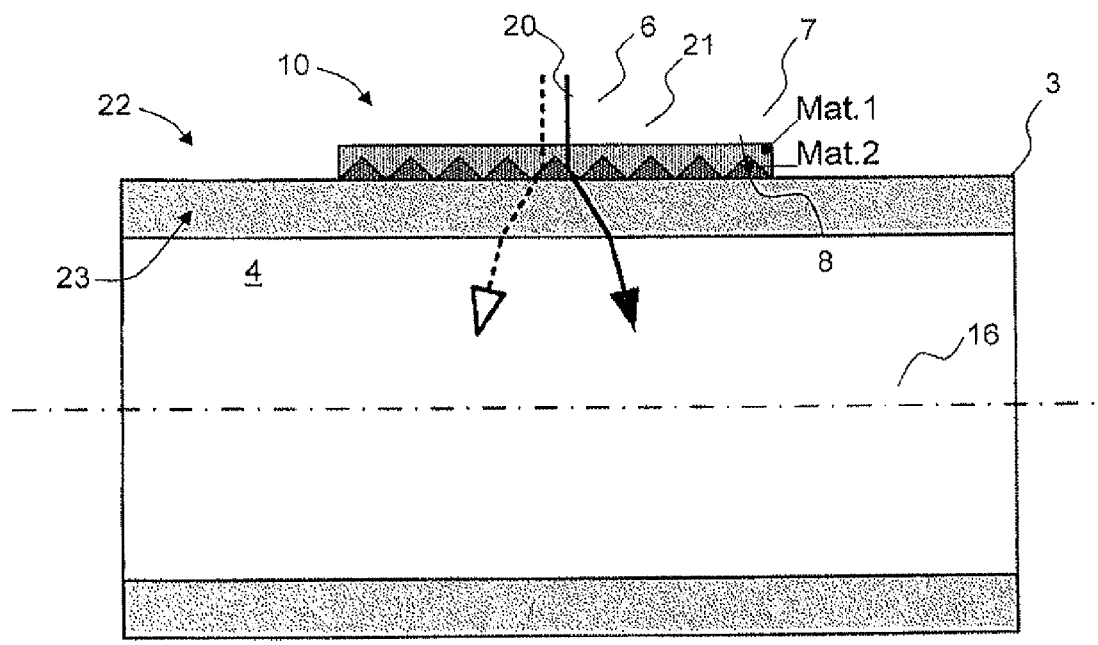
FIG. 4 shows in longitudinal section, an ultrasonic transducer of the invention, with two coupling layers on a measuring tube.

In FIG. 4, the sound velocities in the coupling layers 7 and 8 are exactly reversed.

Figure 5:
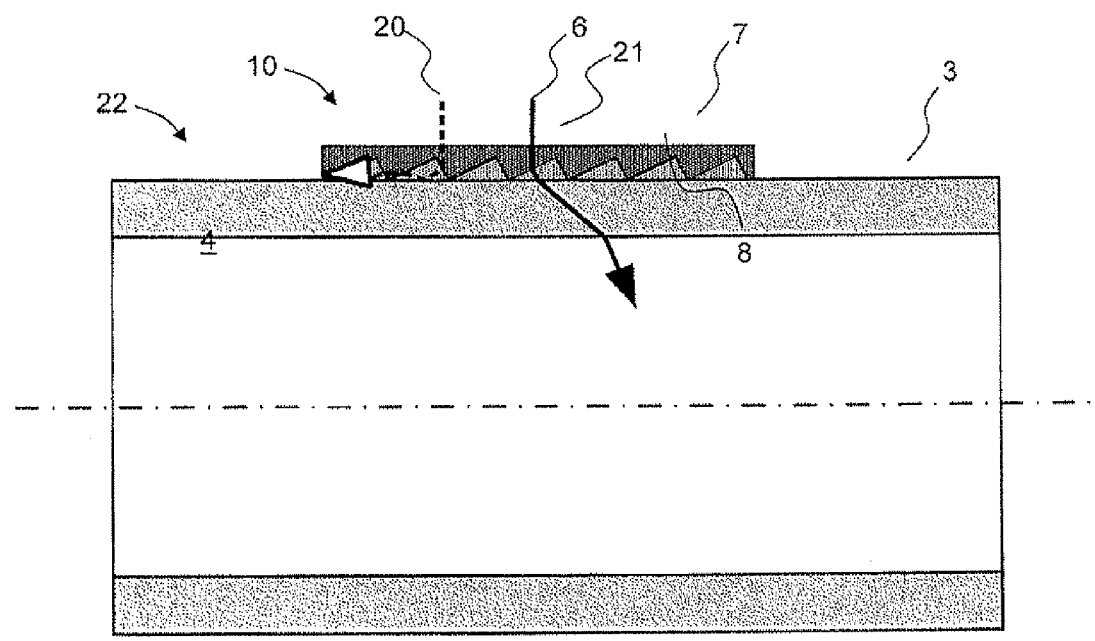
FIG. 5 shows in longitudinal section, an ultrasonic transducer of the invention, with two coupling layers on a measuring tube.

FIG. 5 shows an ultrasonic transducer having sawtooth-shaped recesses 21. The recesses 21 in the first coupling layer 7 are completely filled by the second coupling layer 8. In such case, there occur, in every recess 21, two interfaces between the coupling layers 7 and 8. In the cross section through the sawtooth-shaped recess 21, the one interface is shorter and the other longer. The advantage of providing the embodiment of the trapezoidal recesses 21 in sawtooth form is that the ultrasonic signals radiated from the piezoelectric film 5, which move parallel relative to one another and in a shared, imaginary, axial plane 19, are deflected differently at the interfaces of the coupling layers 7 and 8, since the ultrasonic signals enter at different angles on the shorter and longer interfaces. In this way, as shown, a part of the ultrasonic signal can be radiated at a certain angle in one direction into the measured medium 4, while another, especially a very small, part of the ultrasonic signal is so deflected at an interface, here the shorter interface, that the signal from the ultrasonic transducer 2 is conducted out, without passing through the measured medium 4. However, a part the signal energy is lost in such case. The materials of the coupling layers 7 and 8 are selected according to their acoustic properties, such as e.g. their acoustic impedance or their velocity of sound.

In this drawing, the ultrasonic transducer 2 is applied on the outer wall 22 of the measuring tube 3. It assumes, approximately, the shape of the measuring tube 3 or, at least partially, the shape of the outer wall 22. Thus, here, the ultrasonic transducer 2 assumes the shape of a singly curved shell.

Figure 6:
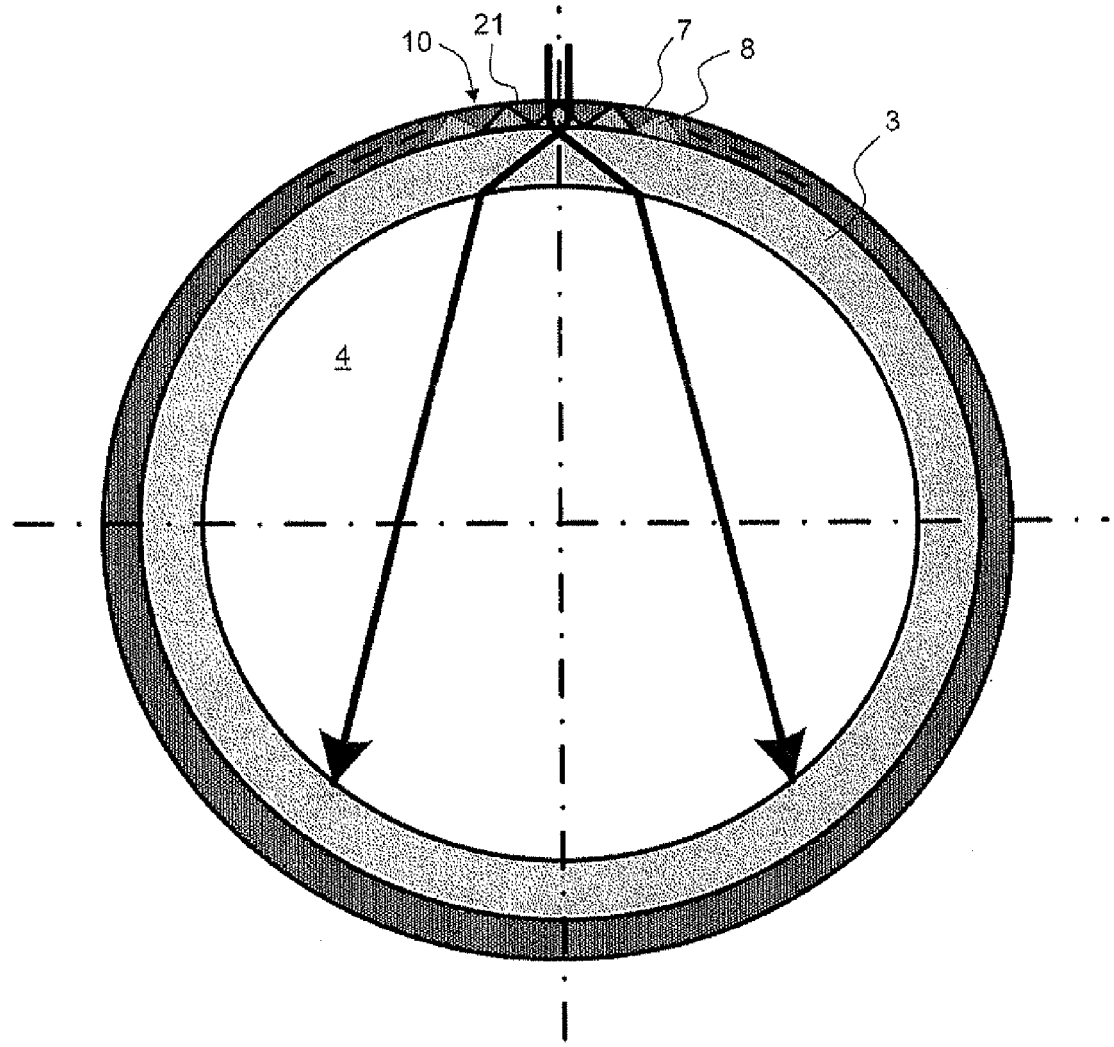
FIG. 6 shows in cross section, an ultrasonic transducer of the invention, with two coupling layers on a measuring tube.

FIG. 6 views a part of a section of an ultrasonic transducer 2 of the invention. The ultrasonic transducer 2 is composed of a piezoelectric film 5 (not shown) and a coupling element between measuring tube 3 and piezo 5. The coupling element is composed of two coupling layers. The trapezoidal recesses 21 extend essentially parallel to the tube axis 16 in the side of the first coupling layer 7 facing the measured medium 4. The second coupling layer 8 is located between measuring tube 3 and first coupling layer 7 and fills the recesses 21 in the first coupling layer 7 completely. In this way, the ultrasonic signals, entering essentially perpendicularly to the first surface 10 of the first coupling layer 7 and moving essentially in an imaginary radial plane, are turned, according to the known factors, at an angle to an imaginary axial plane, thus perpendicularly to the main flow direction of the measured medium 4 in the measuring tube 3.

The ultrasonic transducer 2 is applied about the complete measuring tube periphery. Refractions of the ultrasonic signal are, in turn, possible at the inner wall 23 of the measuring tube 3 or at the surfaces of the recesses 21 of the ultrasonic transducer 2.

Figure 7:
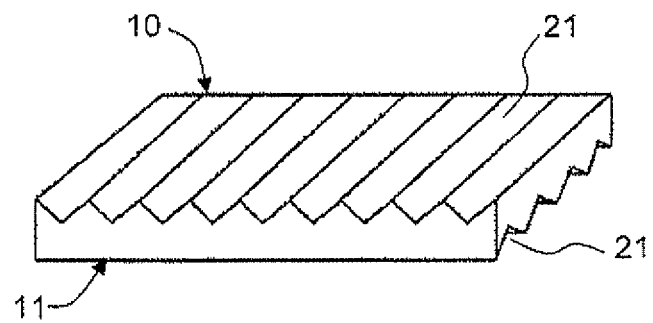
FIG. 7 shows perspectively, a coupling layer of the invention for an ultrasonic transducer.

FIG. 7 shows, perspectively, a coupling layer 7. On both sides of the coupling layer, thus both on its first surface 10, as well as also on its second surface 11, triangle-shaped recesses 21 are provided. The recesses 21 form grooves. The grooves on the first side are perpendicular to the grooves of the second side.

Figure 8:
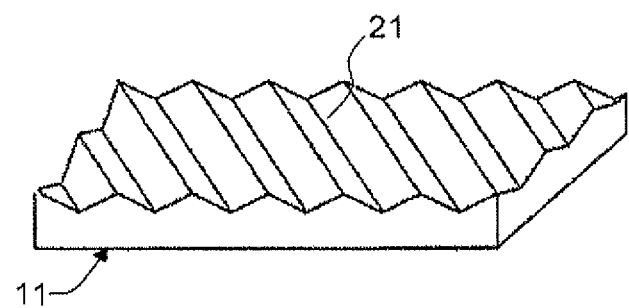
FIG. 8 shows perspectively, a coupling layer of the invention for an ultrasonic transducer.

FIG. 8 shows, in contrast, a coupling layer 7 with recesses 21 provided only in a surface 10. If this coupling layer 7 is placed about a measuring tube 3 (not shown), then the grooves formed of the recesses 21 are at an angle of about 45° to the tube axis 16, or to the main flow direction of the measured medium 4 in the measuring tube 3. Such grooves can be realized by simple cutting of screw threads, e.g. in the inner wall 23 of the measuring tube 3.

Figure 9A:
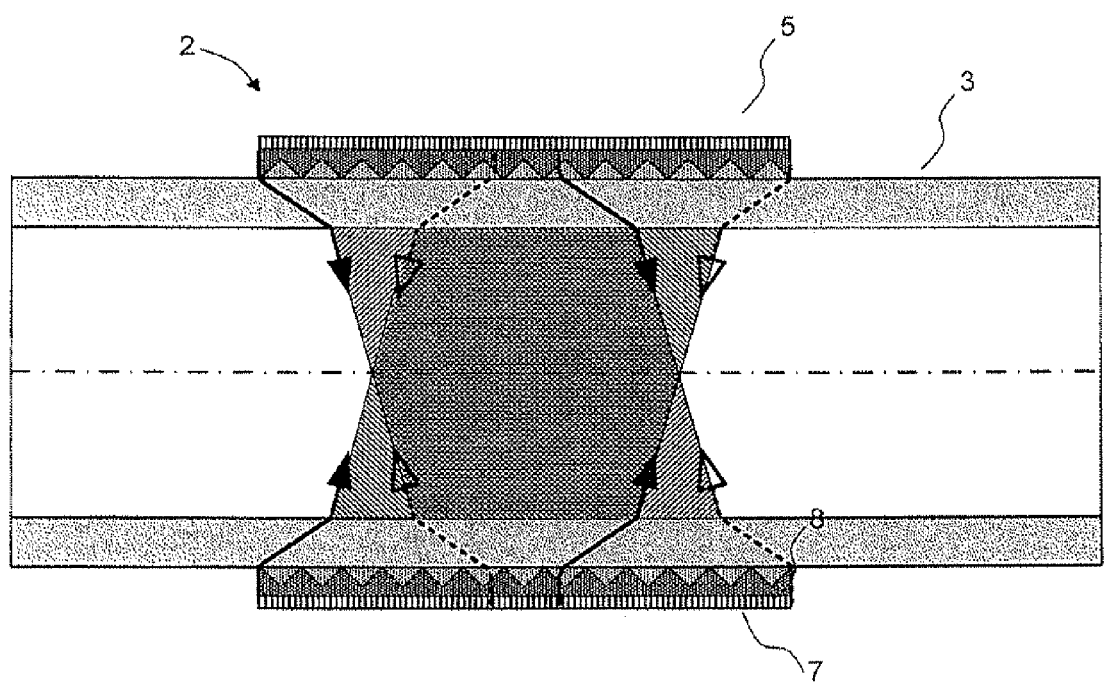
FIG. 9 shows in longitudinal- and cross-section, a measuring system of the invention, with an ultrasonic transducer.
Figure 9B:
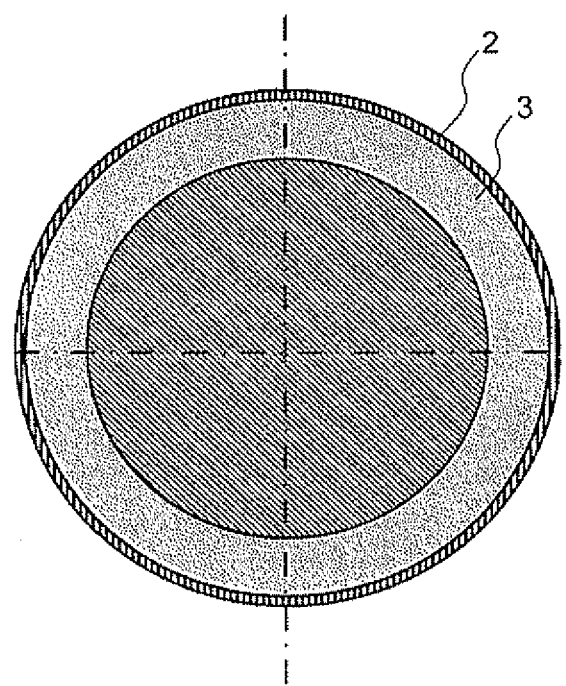
Figure 10A:
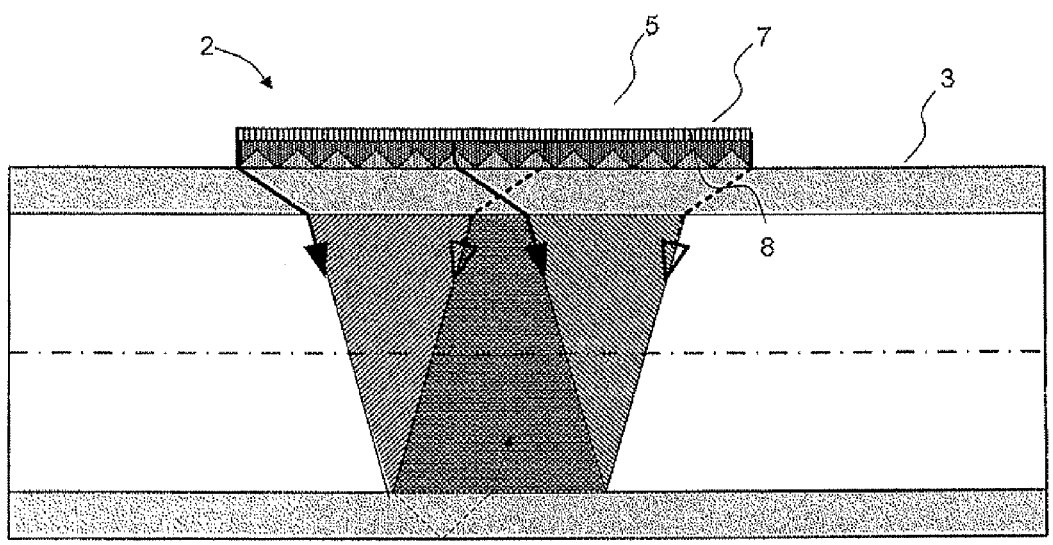
FIG. 10 shows in longitudinal- and cross-section, a measuring system of the invention, with an ultrasonic transducer.
Figure 10B:
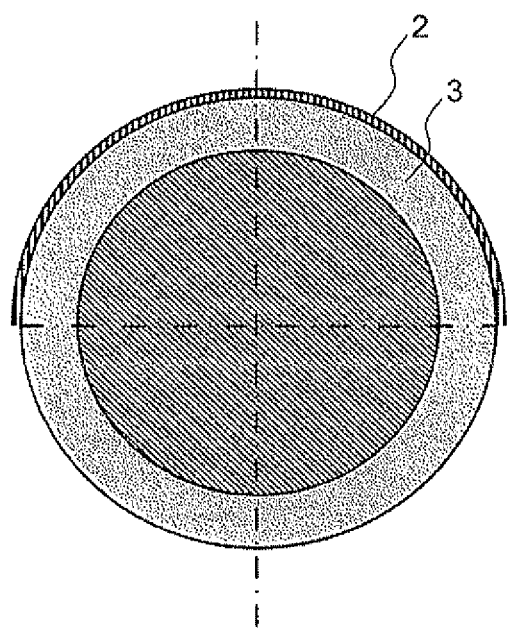

FIGS. 9 and 10 are longitudinal- and cross-sections of measuring systems of the invention. In each case, the complete cross section of the measuring tube 3 is passed through by the sound of the ultrasonic signals. The ultrasonic transducer covers, in such case, in FIG. 10, only half of the outer wall 24 of the measuring tube 3, while, in FIG. 9, the complete measuring tube periphery is covered. These are results of the different refractions of the ultrasonic signals. In FIG. 9, the ultrasonic signal is not refracted at the measuring tube inner wall 23 or at the interfaces of the coupling layers 7, 8 and reaches, thus, to the electromechanical transducer 5, which, on its part, transduces the received signal. In FIG. 10, in contrast, the ultrasonic signal is reflected back to the electromechanical transducer 5, which then further processes the signals. In such case, FIGS. 9b and 10b show the cross sections for the longitudinal sections shown in FIGS. 9a and 10a. To be seen is the degree of covering of the tubes 3 by the ultrasonic transducers 2. FIG. 10a shows the signal route in the case of reflection on the measuring tube outer wall.

Figure 11:
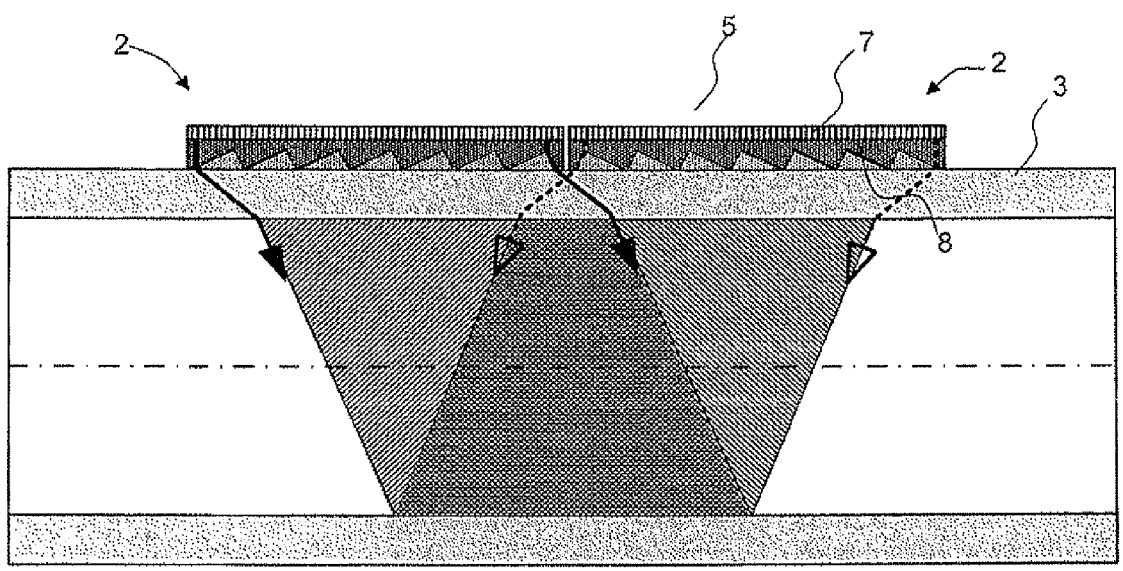
FIG. 11 shows in longitudinal section, a measuring system of the invention, with two ultrasonic transducers.
Figure 12:
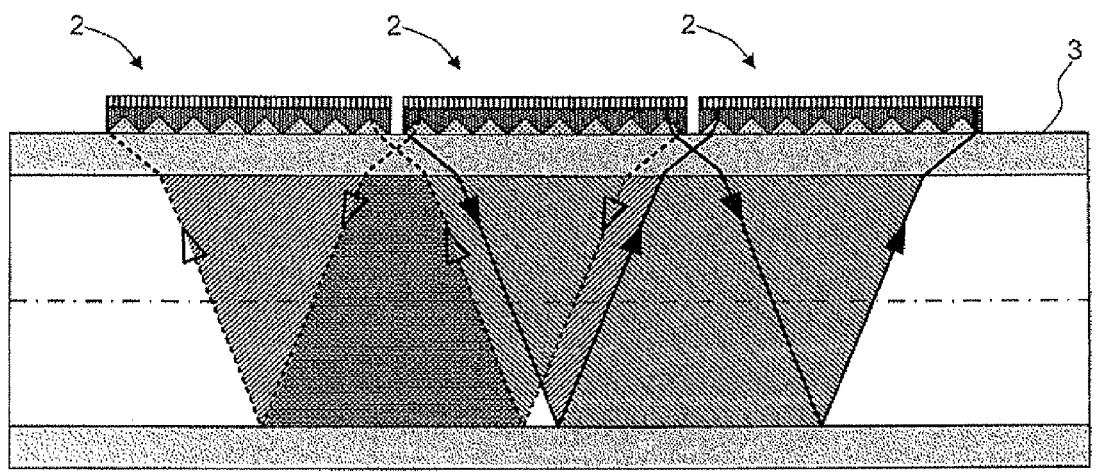
FIG. 12 shows in longitudinal section, a measuring system of the invention, with three ultrasonic transducers.

FIGS. 11 and 12 show, likewise, longitudinal sections of a measuring system 1. In FIG. 11, two ultrasonic transducers 2 are applied on a measuring tube 3. Each transducer 2 transmits ultrasonic signals in the direction of the other transducer 2. The one transmits, thus, upstream, the other downstream. Received is, in each case, the signal of the other ultrasonic transducer 2. For such purpose, an asymmetric profile of the recesses 21 is of advantage.

FIG. 12 shows three ultrasonic transducers 2 in a row. The middle ultrasonic transducer 2 serves, in such case, as transmitter, while the two others are utilized only as receivers. The transmitter transmits both in, as well as also opposite to, the main flow direction of the measured medium 4 in the measuring tube 3.

Figure 13:
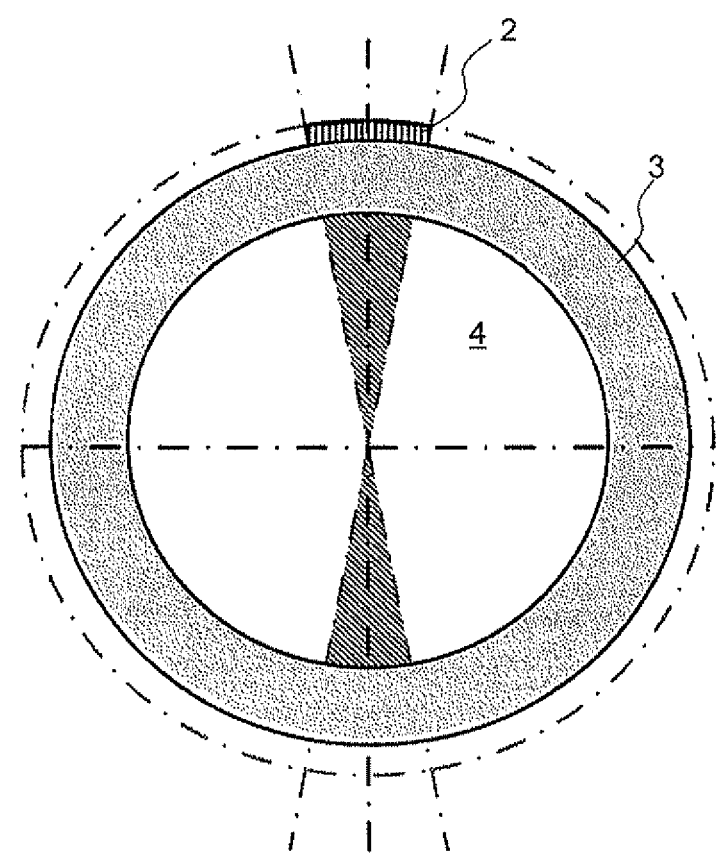
FIG. 13 shows in cross section, a measuring system of the invention, with two or three ultrasonic transducers.

The cross section illustrated in FIG. 13 can stem both from a measuring system with one ultrasonic transducer 2, as well as also from a plurality of ultrasonic transducers 2 in a row. The region of the measured medium 4 in the measuring tube 3, which is passed through by the sound of the ultrasonic signals is shown cross-hatched. The measuring system is, as easily seen here, very flat, in contrast to the state of the art. It is, thus, subjected to mechanical loadings, comparatively, less frequently, which are, in any event, essentially smaller.

Figure 14:
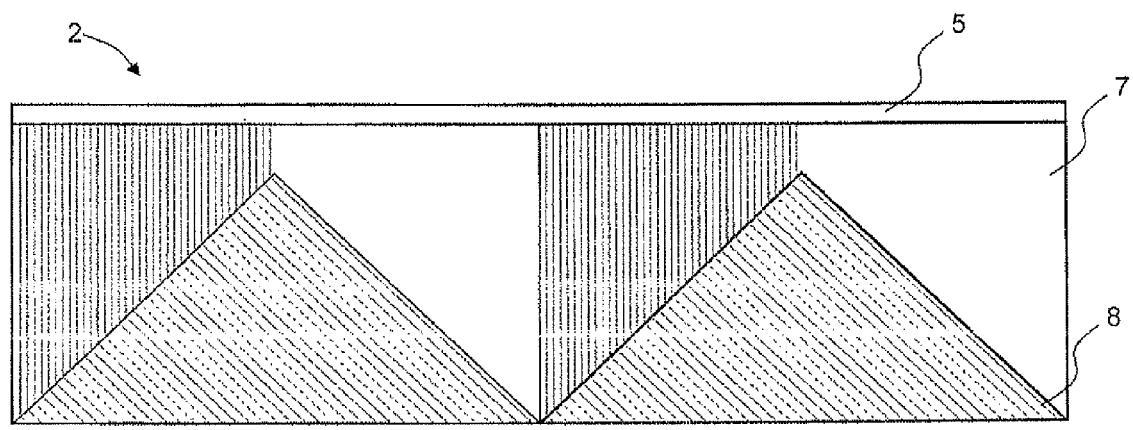
FIG. 14 shows in cross section, structure of an ultrasonic transducer of the invention.

FIG. 14 shows an ultrasonic transducer 2 of the invention. The electromechanical transducer element 5 is applied on a first coupling layer 7. A second coupling layer 8 is in contact with the first coupling layer 7 and with the outer wall 22 of the measuring tube 3. A measured medium 4 is located in the interior of the measuring tube 3. On the detail drawing of a triangularly shaped recess 21 are to be seen individual signal paths 6 on which ultrasonic signals propagate as modeled. The signal paths 6 are essentially parallel to one another and approximately parallel to a surface or to a side of the, in cross section, triangularly shaped recess 21. This embodiment achieves that loss of signal energy by refractions is only very slight. The ultrasonic signals of the coupling layer 8 radiate over the entire area 13. If the signal paths are not parallel to a lateral surface of the triangularly shaped recess 21, a signal gap results and, thus, loss of signal energy.

Figure 15:
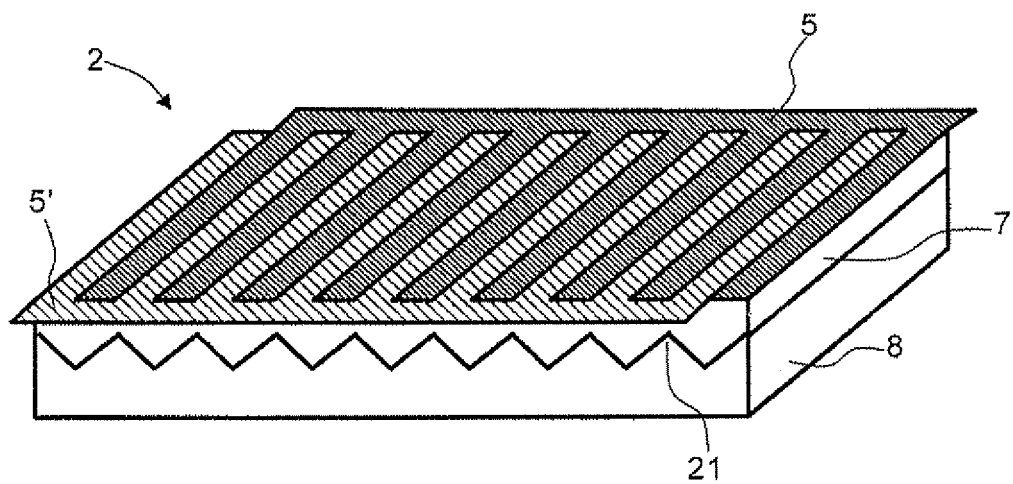
FIG. 15 shows an ultrasonic transducer array on a coupling element of the invention, composed of two coupling layers.

FIG. 15 shows an ultrasonic transducer array of two ultrasonic transducer elements 5, 5' engaging one another. The ultrasonic transducer elements 5, 5' can, in such case, be composed also of a single film with electrodes applied, e.g. sputtered on, at certain spacings relative to one another. Preferably, they are, such as here disclosed, arranged over a triangularly shaped recess 21 and cover, in each case, a deflecting side of the triangle.

The invention claimed is:

1. A measuring system for determining and/or monitoring flow of a measured medium through a measuring tube, comprising:

at least one ultrasonic transducer; and at least one control/evaluation unit, which, on the basis of measurement signals or on the basis of measurement data derived from the measurement signals, ascertains volume- and/or mass-flow of the medium flowing in said measuring tube, wherein:

said ultrasonic transducer has at least one electromechanical transducer element, which sends and/or receives ultrasonic signals; and at least one coupling layer in a region between said electromechanical transducer element and the medium, which coupling layer conducts the ultrasonic signals;

said ultrasonic transducer is acoustically coupleable with said measuring tube and said ultrasonic transducer is embodied in such a manner that it is fittable to the shape of the inner, and/or outer, wall of said measuring tube.

2. The measuring system as claimed in claim 1, wherein: said electromechanical transducer element is flexible.

3. The measuring system as claimed in claim 1, wherein: said electromechanical transducer element is a film.

4. The measuring system as claimed in claim 1, wherein: said electromechanical transducer element is applicable on a first surface of said coupling layer and the ultrasonic signal enters into said first surface and/or exits out of said first surface, in both cases essentially perpendicularly to said first surface; and said coupling layer, at least partially, so refracts the ultrasonic signal, that a first directional component of the ultrasonic signal points in, or opposite to, the flow direction of the measured medium in said measuring tube and/or that a second directional component of the ultrasonic signal is perpendicular to the flow direction of the measured medium in said measuring tube.

5. The measuring system as claimed in claim 3, wherein: a second directional component of said ultrasonic signal is essentially perpendicular to the entering, or exiting, direction of the ultrasonic signal, respectively, into and out of said first surface of said coupling layer.

6. The measuring system as claimed in claim 4, wherein: said electromechanical transducer element is applicable on said first surface of said coupling layer and the ultrasonic signal enters into said first surface and/or exits out of said first surface, in both cases essentially perpendicularly to said first surface; and said coupling layer so refracts the ultrasonic signal onto two signal paths, that a first directional component of the ultrasonic signal on a first signal path points in, and a third directional component of the ultrasonic signal on a second signal path opposite to, the flow direction of the measured medium in said measuring tube.

7. The measuring system as claimed in claim 1, wherein: said coupling layer has at least one recess, which recess has an approximately trapezoidal cross section.

8. The measuring system as claimed in claim 7, wherein: said recess forms a groove.

9. The measuring system as claimed in claim 8, wherein: the groove extends at an angle of 0° to 90° to the tube axis.

10. The measuring system as claimed in claim 7, wherein: said at least one recess is arranged approximately uniformly over the surface of said coupling layer.

11. The measuring system as claimed in claim 7, wherein: said recesses are introduced on two oppositely lying sides of said coupling layer.

12. The measuring system as claimed in claim 7, wherein: said recesses are integral components of said measuring tube.

13. The measuring system as claimed in claim 12, wherein: said measuring tube has a screw thread in its inner wall and/or outer wall.

14. The measuring system as claimed in claim 7, wherein: said recesses are triangularly shaped, wherein a side of the triangularly shaped recess is essentially parallel to at least one propagation direction of the ultrasonic signal.

15. The measuring system as claimed in claim 7, wherein: the measuring system determines and/or monitors flow of the medium through said measuring tube with a travel-time difference method or a Doppler method.

* * * * *